United States Patent
Langerbeins et al.

(10) Patent No.: US 8,470,945 B2
(45) Date of Patent: *Jun. 25, 2013

(54) POLYMERISABLE MASS WITH CROSS-LINKING NANOPARTICLES

(75) Inventors: Klaus Langerbeins, Geesthacht (DE); Uwe Dietrich Kühner, Hamburg (DE); Werner Siol, Darmstadt (DE)

(73) Assignee: Nanoresins AG, Geesthact (DE)

( * ) Notice: Subject to any disclaimer, the term of this patent is extended or adjusted under 35 U.S.C. 154(b) by 228 days.

This patent is subject to a terminal disclaimer.

(21) Appl. No.: 12/988,263

(22) PCT Filed: Apr. 20, 2009

(86) PCT No.: PCT/EP2009/002856
§ 371 (c)(1),
(2), (4) Date: Oct. 15, 2010

(87) PCT Pub. No.: WO2009/127435
PCT Pub. Date: Oct. 22, 2009

(65) Prior Publication Data
US 2011/0046331 A1    Feb. 24, 2011

(30) Foreign Application Priority Data
Apr. 18, 2008 (EP) .................................... 08007580

(51) Int. Cl.
*C08F 118/02* (2006.01)
*C08F 230/08* (2006.01)
*B82Y 30/00* (2011.01)

(52) U.S. Cl.
USPC ............................ 526/319; 526/279; 977/773

(58) Field of Classification Search
USPC ............ 526/262, 279, 319; 524/494; 977/773
See application file for complete search history.

(56) References Cited

U.S. PATENT DOCUMENTS

| 2,801,185 A | * | 7/1957 | Iler | 106/490 |
| 5,965,299 A | * | 10/1999 | Khan et al. | 429/313 |
| 6,299,799 B1 | * | 10/2001 | Craig et al. | 252/500 |

FOREIGN PATENT DOCUMENTS

| EP | 0505230 | 9/1992 |
| EP | 505230 A1 * | 9/1992 |
| WO | 9859388 | 12/1998 |
| WO | 0073393 | 12/2000 |

\* cited by examiner

*Primary Examiner* — Michael M Bernshteyn
(74) *Attorney, Agent, or Firm* — Casimir Jones, S.C.

(57) ABSTRACT

The invention provides a polymerizable composition which comprises:
  a) acrylates and/or methacrylates,
  b) 0.05% to 70% by weight of $SiO_2$ particles having an average particle size of 1 to 30 nm which have polymerizable groups of the methacryloyl, acryloyl, styryl, itaconyl, crotonyl, vinyl, allyl and/or alkenyl type on the surface and are present in dispersion in the acrylates and/or methacrylates, at least 50% of the $SiO_2$ particles consisting of individual, unaggregated or unagglomerated primary particles,
  c) not more than 2% by weight of crosslinker molecules.

50 Claims, No Drawings

POLYMERISABLE MASS WITH CROSS-LINKING NANOPARTICLES

This application is a §371 U.S. National Entry of International Application No. PCT/EP2009/002856, filed Apr. 20, 2009, which claims the benefit of European Application No. 08007580.7, filed Apr. 18, 2008.

The invention relates to a polymerizable composition based on acrylates and/or methacrylates and also to polymeric materials produced using such a composition. These materials are notable for good mechanical and optical properties at room temperature and formability at elevated temperature.

Polyacrylates and polymethacrylates have long been known in the prior art. They are used, for example, for producing Plexiglas or what are called acrylate rubbers. The good properties of these materials can be further enhanced by stretching at temperatures above the glass transition temperature (DE 4443355).

The mechanical properties of polymers can be enhanced by fillers. Owing to the relatively easy hydrolyzability of acrylate ester groups, for polyacrylates only a few fillers can be used, an example being carbon black. Carbon black, however, impairs the frequently desired transparency of polyacrylates.

There are various applications that employ acrylate and methacrylate networks modified with inorganic nanoparticles, particular instances including scratch-resistant coatings (DE 698 26 226) or dental materials (DE 196 17 931). Networks based on methacryloyloxypropyl-grafted $SiO_2$ nanoparticles and methyl methacrylate are described by Mauger et al. (Polym Int 53: 378 (2004)). DE 199 33 098 discloses nanoparticle-modified binders which are prepared by reaction of nanoparticles with epoxy-functional binders. This reaction is said to result in particularly good distribution of the nanoparticles in the matrix.

The cited prior art is focused on increasing the hardness, the scratch resistance or the corrosion resistance. Many plastics applications, however, require deformability, as for instance in a glazing material application, as a tunnel arch, for example.

The object on which the invention is based is that of providing a polymerizable composition of the above-specified type which has diverse possible uses and imparts good mechanical properties to the materials that can be produced from such polymerizable compositions. At temperatures above the glass transition temperature, $T_g$, of the material, there shall preferably be a certain elongability, which allows forming.

The invention provides a polymerizable composition which comprises:
 a) acrylates and/or methacrylates,
 b) 0.1% to 70% by weight of $SiO_2$ particles having an average particle size of 1 to 30 nm which have polymerizable groups of the methacryloyl, acryloyl, styryl, itaconyl, crotonyl, vinyl, allyl and/or alkenyl type on the surface and are present in dispersion in the acrylates and/or methacrylates, at least 50% of the $SiO_2$ particles consisting of individual, unaggregated or unagglomerated primary particles,
 c) not more than 2% by weight of crosslinker molecules.

The polymerizable composition of the invention is based on acrylates and/or preferably on methacrylates. As filler it comprises nanoscale $SiO_2$ particles which have polymerizable groups on their surface. Such polymerizable groups may be attached chemically to the surface of the $SiO_2$ particles by means, for example, of suitable silanization or another modification, described below.

The preparation of silanized $SiO_2$ nanoparticles having polymerizable groups on the surface is already known in principle in the prior art. For example, $SiO_2$ particles can be precipitated from silica sols and subsequently silanized with organosilanes such as vinylsilanes, for example. A preparation of this kind via precipitated silicas is described in EP 0 926 170 B1, for example.

Another possibility is described in J. Colloid Interface Sci 26: 62 (1968), for example. It relates to what is called the Stöber synthesis of such nanoparticles.

One source contemplated for the unmodified $SiO_2$ particles is dispersions of colloidal silicon dioxide in water or solvents. It is immaterial whether this silicon dioxide is obtained by the hydrolysis of alkoxysilanes or by other methods. Particularly suitable are particles of the kind formed in the condensation of acidified waterglass. Numerous methods for this are described in the literature, and a series of products is available on the commercial market. These include, for example, Bindzil 40/130 and Bindzil 40/220 (Eka Chemicals), Levasil 200/40% (H.C. Starck) or else Nalco 2327 and Nalco 2329 (Nalco Company). Examples of commercial solvent sols are IPA-ST and MIBK-ST from Nissan Chemical American Corporation.

The silicon dioxide particles preferably have a surface modification for functionalization and where appropriate for compatibilization with the monomers. Known methods of surface functionalization that are familiar to those in the art include, for example, the silanization of the surface, alcoholysis, the use of acidic, basic or ionic compounds which form ionic bonds with the polar surface, the free-radical attachment of polymers and monomers, and the merely physical attachment of hydrophobic polymers.

The silanization of the surface of the $SiO_2$ particles is accomplished preferably with organosilanes or organosiloxanes. This silanization is a technology which is familiar in the art.

The organosilanes or organosiloxanes are preferably selected from the group consisting of organosilanes of the formula $R^1_a SiX_{4-a}$, organosilanes of the formula $(R^1_3Si)_b NR^1_{3-b}$ and organosiloxanes of the formula $R^1_n SiO_{(4-n)/2}$, in which each $R^1$ is selected independently from hydrocarbon radicals having 1 to 18 carbon atoms or organofunctional hydrocarbon radicals having 1 to 18 carbon atoms or is a hydrogen atom, each X, selected independently, is a hydrolyzable group, a=0, 1, 2 or 3, b=1, 2 or 3, and n is a number from 2 up to and including 3. Examples of hydrolyzable groups are halogen, alkoxy, alkenoxy, acyloxy, oximino and amineoxy groups. The organofunctional hydrocarbon radicals are preferably, in particular, unsaturated radicals, which are reactive in a free-radical polymerization. Examples of such organic radicals are those containing methacryloyl, acryloyl, styryl, vinyl, hexenyl and allyl functionalities or groups.

Contemplated for the functionalization of the particles with reactive groups are, for example, vinyltrimethoxysilane, vinyltriethoxysilane, methylvinyldimethoxysilane, methylvinyldiethoxysilane, vinyldimethylmethoxysilane, vinyldimethylethoxysilane, divinyldimethoxysilane, divinyldiethoxysilane, vinyltriacetoxysilane, vinyltrichlorosilane, methylvinyldichlorosilane, dimethylvinylchlorosilane, divinyldichlorosilane, vinyltris(2-methoxyethoxy)-silane, hexenyltrimethoxysilane, gamma-methacryloyloxypropyltrimethoxysilane, gamma-methacryloyloxypropyltriethoxysilane, gamma-methacryloyloxypropyltriacetoxysilane, methacryloyloxymethyltrimethoxysilane, methacryloyloxymethyltriethoxysilane, (methacryloyloxymethyl)methyldimethoxysilane, (methacryloyloxymethyl)methyldiethoxysilane, acryloyloxypropyltrimethoxysilane, acryloyloxypropyltriethoxysilane, gamma-methacryloyloxypropyltrichlorosilane, gamma-methacryloyloxypropyldimethylchlorosilane, vinylbenzylethylenediaminepropyltrimethoxysilane, vinylbenzylethylenediaminepropyltrimethoxysilane hydrochloride, allylethylenediaminepropyltrimethoxysilane, allylethylenediaminepropyltriethoxysilane, allyltrichlorosilane, allylmethyldichlorosilane, allyldimethylchlorosilane, allyltrimethoxysilane, allyltriethoxysilane, allylmethyldimethoxysilane, allylmethyldiethoxysilane, allyldimethylmethoxysilane, allyldimethylethoxysilane, divinyltetramethyldisilazane, divinyltetramethyldisiloxane, trimethyltrivinylcyclotrisiloxane, tetramethyltetravinylcyclotetrasiloxane, pentamethylpentavinylcyclopentasiloxane and hexamethylhexavinylcyclohexasiloxane. Use may be made of mixtures of these silanes with one another or with non-functionalized silanes such as chlorotrimethylsilane or octyltrimethoxysilane, for example. The silanization may also be carried out in two or more steps and in different solvents.

In an alternative method for the surface modification, the $SiO_2$ particles may be treated with alcohols, polyols or mixtures thereof. As a result of the treatment, silanol groups on the surface of the $SiO_2$ particle bind chemically with the hydroxyl groups of the alcohol, thus forming ester groups attached on the surface. This technology is described in U.S. Pat. No. 2,801,185, for example. For the purposes of this invention it is preferred to use primary alcohols that are unsaturated, at least in part. Examples of such alcohols are hydroxyethyl acrylate, hydroxyethyl methacrylate, and allyl alcohol.

A further method for the functionalization is the modifying of the surface with anchor groups, examples being functionalized silanes. These silanes possess a reactive group which is able in a second step to react with a molecule which itself possesses two reactive groups. One group reacts with the silane, while the other is reactive in the free-radical polymerization.

Likewise possible for use is a halosilane, such as a chlorosilane, for example. The silanes may be functionalized, for example with polymerizable groups, more particularly vinyl groups. In the context of the invention it is possible to carry out two silanization steps in succession using different silanes. For example, a functionalized silane, preferably a vinyl silane, can be used in only one of the two silanization steps. It is likewise possible to use mixtures of functionalized and non-functionalized silanes in one silanization step.

The invention has recognized that these surface-modified $SiO_2$ particles are able, surprisingly, to act as crosslinking points in the free-radical polymerization of the polymerizable composition, and to induce effective crosslinking of the cured poly(meth)acrylate. In the context of the invention, therefore, the polymerizable composition contains no conventional crosslinker molecules, or at most only a small amount (not more than 2% by weight). The term "crosslinker molecules" identifies low molecular mass (preferably monomeric) molecules having at least two polymerizable double bonds, which are able initially to link linear or branched macromolecular networks to form three-dimensional polymeric networks. Crosslinkers are defined in Römpp Chemie-Lexikon, 10$^{th}$ edition, volume 6, page 4836.

The invention allows an elongation at break which is substantially improved by comparison with conventional crosslinker molecules. Using crosslinkers of the prior art produces a close-meshed network which is therefore of low elongability. With the polymerizable composition of the invention, as a result of the surface-modified $SiO_2$ particles used, the nodes obtained are fewer, but a plurality of long network arcs are obtained "from node to node", i.e., from particle to particle. A network of this kind is capable of greater elongation and is nevertheless firm.

The acrylates and/or methacrylates preferably have 1 to 12, preferable 1 to 6, C atoms in the alkyl chain. The alkyl chain may be linear or branched.

The polymerizable composition contains preferably 50% to 99.5% by weight of acrylates and/or methacrylates. Preference is given to alkyl methacrylates where alkyl is methyl, ethyl, butyl, isobutyl or cyclohexyl. A particularly preferred monomer is methyl methacrylate. In one preferred embodiment, said monomer is present to an extent of at least 60%, and more preferably at least 70% or 80%, by weight in the polymerizable composition.

Preferred lower limits for the average particle size of the $SiO_2$ particles are 2 nm, 3 nm, 4 nm and 5 nm. Preferred upper limits are 25 nm and 20 nm. The lower and upper limits may be combined arbitrarily to form ranges according to the invention. The particle size may be effected in solution by means of dynamic light scattering on a Dynamic Light Scattering Particle Size Analyzer LB-550 from Horiba with a concentration of not more than 10% by weight of particles, the dispersion having not more than a dynamic viscosity of 3 mPas at 25° C. The particle size reported is the median (D50 value) of the particle size distribution.

In the solid, the particle size can be determined by transmission electron microscopy. For this purpose, at least 100 particles are subjected to measurement, and a particle size distribution is formed.

The surface coverage of the $SiO_2$ particles with polymerizable groups is preferably between 0.01-10 groups/nm$^2$, more preferably 0.01-6 groups/nm$^2$, more preferably 0.01-4 groups/nm$^2$ of the surface of the particles. It is preferred if between 10 and 2500 polymerizable groups are attached to the surface per $SiO_2$ particle. Another preferred upper limit is 2000 groups per particle.

Beyond the polymerizable groups, the particles may also carry groups which do not react in a polymerization.

The surface area of the particles may be calculated from the particle size, for spherical particles. The calculation is carried out employing the median of the particle size distribution (D50). The specific surface area ($A_0$) can then be calculated using the density of the particle ($\rho$):

$$A_0 = 6/(\rho \times D50).$$

The density of colloidal silicon dioxide is 2.1 g/cm$^3$. The number of reactive groups per unit surface area ($n_R^A$) is a product of the ratio of the number of reactive groups ($n_R^M$) per mass, divided by the specific surface area:

$$n_R = (n_R^M/A_0).$$

The number of reactive groups per mass $n_R^M$ can be determined via suitable analytical methods. Where silanes of the alkoxy, acyloxy, acetoxy, or alkenoxy type or oximosilanes are employed to bring the reactive groups onto the surface, the hydrolysis of the silane can be assumed to be complete. This means that all of the groups used are found on the surface of the particles again.

The number of polymerizable groups on the particle surface may also be determined by NMR spectroscopy or by means of DSC (differential scanning calorimetry). These methods may be employed especially when suitable analytical methods for the determination of reactive groups (an example being iodine number determination in the case of vinyl groups) are unavailable. In the case of DSC, the heat of polymerization is measured, as a measure of the number of polymerizable groups on the particle surface. With this DSC determination, a defined amount of the surface-modified $SiO_2$ particles is admixed with a standardized peroxide solution and the heat of reaction is measured. The method is described in DE 36 32 215 A1, for example.

Beyond the polymerizable groups, the particles may also carry groups which do not react in a polymerization.

In one variant of the invention at least two different polymerizable groups are disposed on the surface of the $SiO_2$ particles. These groups may more particularly comprise firstly acryloyl, styryl, itaconyl and/or methacryloyl groups and secondly crotonyl, vinyl, allyl and/or alkenyl groups.

Dual surface modification of the $SiO_2$ particles in this way has the advantage that polymerizable groups with different reactivity can be applied to the particle surface. In the free-radical polymerization, for example, acryloyl and/or methacryloyl groups react earlier than vinyl groups or, in particular, allyl groups. It is therefore possible, for example, to cause, first of all, only the methacryloyl groups on the surface of the $SiO_2$ particles to undergo crosslinking reaction, at a relatively low temperature of 70° C., for example, and at a later point in time in the polymerization to raise the temperature, to 90° C., for example, so that allyl groups located on the surface react as well. Alternatively it is possible to use different, and differently reactive, acrylate and/or methacrylate monomers, which are metered in in succession, with only the later-metered monomer reacting with the allyl groups.

Preferably at least 70% of the $SiO_2$ particles consist of individual, unaggregated or unagglomerated primary particles. Further preferred lower limits are 80%, 90%, 95% and 98%. These percentages are percent by weight. In accordance with this aspect of the invention, therefore, it is possible to provide a dispersion which is substantially free of aggregates and/or agglomerates of the $SiO_2$ particles. This improves the processing properties (lower viscosity) and the mechanical properties of intermediates and end products produced therewith. Fumed silicas known in the prior art exhibit aggregation/agglomeration of the primary particles, caused by the route of manufacture (flame pyrolysis), to form relatively large structures, and this hinders the processing properties of intermediates and end products produced therefrom.

As a result of the fact that the particles are present in dispersion in the (meth)acrylate, it is possible for the dispersion of the particles in the case of the polymerization to be uniform. Where the particles are not in dispersion in the (meth)acrylate, the polymerization may be accompanied by agglomeration or by heterogeneous distribution of the particles in the polymer.

By using two different polymerizable groups on the particle surface, and causing sequential reaction with two different monomers, it is possible to produce a polymer which comprises two different polymer networks in opposing penetration.

In order to produce a dual surface modification of this kind, the corresponding silanes and/or siloxanes may be reacted in a mixture for the silanization of the silicon dioxide particles.

It is preferred for the fraction of the acryloyl, styryl, itaconyl and/or methacryloyl groups as a proportion of the polymerizable groups on the surface to be 95% to 5% and for the fraction of the crotonyl, vinyl, allyl and/or alkenyl groups as a proportion of the polymerizable groups on the surface to be 5% to 95%.

It is preferred for the $SiO_2$ particles to have 0.01-3 methacryloyl groups/$nm^2$ and additionally 0.01-3 vinyl groups/$nm^2$ on the surface. A dual surface modification of this kind of the $SiO_2$ particles has the advantage that the $SiO_2$ particles are incorporated into the polymer chains at different stages in the polymerization. Hence the methacrylate groups on the particle surface ensure that, in the initial phase of the polymerization, the $SiO_2$ particles are already joined to the polymer chains, and through this attachment ensure effective distribution of the particles in the polymethacrylate matrix. In contrast, the effect of the vinyl groups comes to the fore particularly at high conversions, in other words during the final polymerization. As a result of the dual modification, therefore, the events at the beginning of the polymerization are linked to the events during the final polymerization. In this way, the resulting networks are homogeneous and elongable.

The polymers of the invention, after curing, have long polymer network arcs reaching from $SiO_2$ particle to $SiO_2$ particle, i.e., have long poly(meth)acrylate chains. This is critical, however, for thermoforming at high temperatures, e.g., 180° C., since pure poly(meth)acrylate chains exhibit a low ceiling temperature (e.g., about 160° C. for pure PMMA), and also a very high ZIP length (>200). With this high depolymerization tendency, in the case of polymer chains composed only of methacrylate, examples being chains with MMA as main constituent and the methacryloyloxypropyl groups of the $SiO_2$ particle surface as a further constituent, chain scission may lead to the rapid depolymerization of the polymethacrylate chains and hence to a marked reduction in the originally high molecular weight of, for example, 1,000,000 Daltons.

In one preferred embodiment, therefore, the polymerizable composition further comprises depolymerization retardant monomers having a ZIP length of 1 or less. The monomers are selected preferably from the group consisting of C1 to C8 alkyl acrylates, preferably from the group consisting of methyl, ethyl, butyl, and 2-ethylhexyl acrylate. The polymerizable composition may contain, for example, 0.1% to 20%, preferably 0.2% to 10%, more preferably 0.5% to 5% by weight of the depolymerization retardant monomers.

Like the alkyl acrylates, vinyl groups on the surface of the $SiO_2$ particles, as a copolymerization constituent, also reduce rapid depolymerization of the polymer chains after chain scission. Preference is therefore given to formulas, for preparing the polymer networks, that comprise $SiO_2$ particles with 0.2-3 vinyl groups/$nm^2$ on the surface, and additionally 0.5%-5% by weight of alkyl acrylate.

The term "glass transition temperature", Tg, denotes the glass transition temperature of the composition according to the invention following its polymerization (curing). The glass transition temperatures of corresponding homopolymers are known and are listed in J. Brandrup, E. H. Immergut, Polymer Handbook $1^{st}$ Ed. J. Wiley, New York, 1975, for example.

The glass transition temperature of a copolymer can be calculated by what is called the Fox equation (T. G. Fox, Bull. Am. Phys. Soc. (Ser. II), 1, 123 [1956]).

The monomer constituents are preferably selected such that, following their polymerization, the resulting glass transition temperature is >50° C., preferably >100° C. This embodiment is especially suitable for producing solid, elongable acrylates such as aircraft glazing systems, for example.

Preferable for the construction of wide-meshed networks is the absence of low molecular mass crosslinkers, a relatively small number of polymerizable groups on the $SiO_2$ particles that act as crosslinker, and the use of very small amounts of initiator in the initial phase of the polymerization. The use of excessive initiator concentrations results in the formation of short polymer chains and hence to short network arcs, or to polymer chains which are too short in order to link two $SiO_2$ particles with one another.

Of significance in this context is not the overall amount of initiator used, but rather the amount which has decomposed under polymerization conditions. Thus, for example, at 80° C., within 1 h, half of the didodecanoyl peroxide used undergoes decomposition, while the proportion at 62° C. is only about 5%.

The fraction of the crosslinker molecules in the polymerizable composition of the invention is preferably not more than 1%, more preferably not more than 0.5%, more preferably not more than 0.2% by weight. In a further preferred embodiment there are no technically relevant amounts of crosslinker molecules present in the polymerizable composition. The crosslinker function is taken on exclusively by the surface-modified $SiO_2$ particles.

The amount of surface-modified $SiO_2$ particles may be preferably between 0.5% and 5% by weight, more preferably 1% and 2% by weight. The stated variant of the invention can be processed for example by cast polymerization to form a material such as an aircraft glazing system, for example.

In the case of such cast polymers produced from a composition of the invention, the polymers in question are poly (meth)acrylates featuring improved corrosion resistance. They may be stretched, preferably biaxially stretched, and then form a transparent acrylic glass with high toughness and good optical properties (transparency). They are therefore suitable in particular for producing aircraft glazing systems as already stated above.

The invention further provides a polymeric material obtainable by curing a polymerizable composition of the invention.

The invention further provides a polymeric material obtainable by the following process:
a) heating a polymeric material of claim 18 to a temperature T>Tg, preferably T>Tg+10 K, more preferably T>Tg+40 K, more preferably T>Tg+50 K;
b) elongating or compressing the material by at least 5%, preferably at least 10%, in at least one spatial direction;
c) cooling the material under load to a temperature T<Tg.

A stretched material of this kind can be used for example for producing glazing (aircraft glazing) or a medical material such as, for example, a dental polymer film.

The invention additionally provides a process for producing a polymeric material of either of claims 13 and 14, with the steps of:
a) providing a polymerizable composition of any of claims 1 to 11;
b) adding a polymerization initiator;
c) implementing a partial polymerization at a temperature T<Tg, preferably T<Tg−10 K, more preferably T<Tg−20K (Tg of the material to be produced), until at least 50% of the monomers used are polymerized;
d) completing the polymerization at a temperature T>Tg−20 K, preferably T>Tg−10 K, more preferably T>Tg.

Polymerization takes place, preferably using free-radical initiators such as thermally decomposing initiators, redox initiators or UV initiators, in such a way that more than 50% (preferably more than 70%) of the monomers present are polymerized with an effective initiator concentration of 10-200 mol of initiator/1,000,000 mol of monomer, and subsequently the polymerization is completed at T>Tg.

The process preferably comprises the following further steps:
e) heating the polymeric material to a temperature T>Tg, preferably T>Tg+10 K, more preferably T>Tg+40 K, more preferably T>Tg+50 K;
f) elongating or compressing the material by at least 5%, preferably at least 10%, in at least one spatial direction;
g) cooling the material under load to a temperature T<Tg.

The thermoformable articles produced in this way are used with advantage for very different applications. Primarily, these articles represent mechanically and optically high-grade glazing materials, which can be thermoformed within wide limits without exhibiting flow.

In stretched form in particular the aircraft glazing material utility is of interest.

Also apparently of interest—as for example when small amounts of phosphoric acid or phosphoric esters are added—is the use of stretched materials for low-flammability glazing.

A further application lies in the use of the stretched materials as thermally resilient material, for example, as weathering-resistant, shrinkable, and transparent UV protective film.

Very generally, thermoformed articles can be employed as shape memory materials. In this case the fact that the form induced by deformation above Tg can be relaxed not only by heating above Tg but also by exposure to swelling agents such as monomers, for example, is of interest. This is of interest for the use of these shape memory materials as a medical material, for example, as a dental film.

Working examples of the invention are described below. Preparation of a Colloidal Dispersion of Silicon Dioxide in Methyl Methacrylate (P1)

A colloidal silica sol (40% by weight $SiO_2$ in water, particle size (D50) by dynamic light scattering: 25 nm, stabilized with NaOH) was stirred over an acidic ion exchanger (Amberjet 1200H, Rohm & Haas) until a pH of 2-3 was reached. Following filtration to remove the ion exchanger, 600 g of the acidic sol were stirred for 60 minutes with 17.7 g of gamma-methacryloyloxypropyltrimethoxysilane and 10.7 g of vinyltrimethoxysilane.

The sol was diluted with 2000 g of isopropanol and, with addition of 1500 g of isopropanol, approximately 3500 g of solvent/water mixture were distilled off under reduced pressure at 45° C.

This gave 637 g of sol, which were diluted with 1600 g of methyl methacrylate (stabilized with 50 ppm of methoxyhydroquinone). The isopropanol was distilled off under reduced pressure, in the course of which a further 260 g of methyl methacrylate were added.

This gave a clear sol of 42.8% by weight of $SiO_2$ particles in MMA, the particles having 1.6 mmol of vinyl groups/$nm^2$ (from vinyltrimethoxysilane) and 1.6 mmol/$nm^2$ of methacryloyl groups (from gamma-methacryloyloxypropyltrimethoxysilane) on the surface.

EXAMPLE 1

Thermoformable Sheet with 1.7% by Weight of $SiO_2$ Particles

A mixture of
0.07 g didodecanoyl peroxide
0.11 g benzoyl peroxide (with 25% by weight water)
1.00 g ethyl acrylate
47.00 g methyl methacrylate and
2.00 g P1
is degassed (approximately 20 mbar) and introduced at room temperature into a polymerization chamber. External dimensions of the polymerization chamber: 150×200 mm. Construction of the chamber: glass plate/PET film (Hostaphan RN from Mitsubishi Film GmbH)/spacer cord (3 mm)/glass plate.

Polymerization then takes place in a water bath first at 70° C. for 3 hours and then at 85° C. for 2 hours. For the final polymerization, heating takes place in a heating cabinet at 110° C. for 2 hours.

The product is a colorless, transparent, hard sheet which lends itself well to mechanical working (e.g., sawing).

Thermoforming Test

To examine the thermoforming behavior, an approximately 40×80 mm section is sawn from the approximately 3 mm thick sheet and is subjected to a flexural test at 150° C. For this purpose, the sheet is clamped by its long ends and bent over a glass rod (diameter 14 mm) in a heating cabinet. Duration of the forming operation: 20 minutes, after which cooling takes place to room temperature. This gives a glass-clear plastics sheet angled by 90°. The flexural radius at the point of flexure is approximately 10 mm. This corresponds to an elongation/compression of >10%.

Investigation of the Resilience

The plastics angle produced in this way is heated at 150° C. without load for 10 minutes. This gives a smooth, flat sheet again (no discernible remnant deformation).

EXAMPLE 2

Thermoformable Sheet with 0.85% by Weight of $SiO_2$ Particles

The polymerization test of example 1 is repeated, but the composition selected is different: Initial masses: 0.04 g didodecanoyl peroxide, 0.10 g dibenzoyl peroxide, 1 g ethyl acrylate, 48 g methyl methacrylate, 1.0 g P1.

The product is a colorless, transparent, hard sheet.

Thermoforming Test

The procedure in example 1 is repeated, but the support selected for flexing is a glass rod with a thickness of just 6 mm, temperature: 150° C., duration of the bending operation: 20 minutes.

This gives a glass-clear plastics sheet angled by 90°. The flexural radius is approximately 6 mm.

EXAMPLE 3

Thermoformable Sheet with 3.4% by Weight of $SiO_2$ Particles

The test according to example 2 is repeated, but the composition selected is different: Initial masses: 1 g ethyl acrylate, 45 g methyl methacrylate, 4 g P1.

In this case the polymerization chamber is bounded by PET film on both sides.

The product is a colorless, transparent, hard sheet.

Thermoforming Test

The flexural test as in example 1 is carried out. Bending over a glass rod (diameter 14 mm), temperature in the heating cabinet 170° C., duration of the forming operation: 30 minutes, followed by cooling to room temperature. This gives a glass-clear plastics sheet angled by 90°. The flexural radius at the point of flexure is approximately 10 mm.

The invention claimed is:

1. A polymerizable composition comprising:
   a) acrylates and/or methacrylates,
   b) 0.05% to 70% by weight of $SiO_2$ particles having an average particle size of 1 to 30 nm which have polymerizable groups of the methacryloyl, acryloyl, styryl, itaconyl, crotonyl, vinyl, allyl and/or alkenyl type on the surface and are present in dispersion in the acrylates and/or methacrylates, at least 50% of the $SiO_2$ particles consisting of individual, unaggregated or unagglomerated primary particles,
   c) not more than 2% by weight of crosslinker molecules.

2. The polymerizable composition of claim 1, wherein the polymerizable composition comprises 50% to 99.5% by weight of the acrylates and/or methacrylates.

3. The polymerizable composition of claim 2, wherein the polymerizable composition comprises at least 60% by weight of methyl methacrylate.

4. The polymerizable composition of claim 2, wherein the polymerizable composition comprises at least 70% by weight of methyl methacrylate.

5. The polymerizable composition of claim 2, wherein the polymerizable composition comprises at least 80% by weight of methyl methacrylate.

6. The polymerizable composition of claim 1, wherein the average particle size of the $SiO_2$ particles is at least 2 nm.

7. The polymerizable composition of claim 1, wherein the average particle size of the $SiO_2$ particles is at least 3 nm.

8. The polymerizable composition of claim 1, wherein the average particle size of the $SiO_2$ particles is at least 4 nm.

9. The polymerizable composition of claim 1, wherein the average particle size of the $SiO_2$ particles is at least 5 nm.

10. The polymerizable composition of claim 1, wherein the average particle size of the $SiO_2$ particles is 25 nm.

11. The polymerizable composition of claim 1, wherein the average particle size of the $SiO_2$ particles is not more than 20 nm.

12. The polymerizable composition of claim 1, wherein the $SiO_2$ particles have polymerizable groups in a concentration of 0.01-10 groups/$nm^2$ on the surface of the particles.

13. The polymerizable composition of claim 1, wherein the $SiO_2$ particles have polymerizable groups in a concentration of 0.01-6 groups/$nm^2$ on the surface of the particles.

14. The polymerizable composition of claim 1, wherein the $SiO_2$ particles have polymerizable groups in a concentration of 0.01-4 groups/$nm^2$ on the surface of the particles.

15. The polymerizable composition of claim 1, wherein at least 70% of the $SiO_2$ particles consist of individual, unaggregated or unagglomerated primary particles.

16. The polymerizable composition of claim 1, wherein at least 80% of the $SiO_2$ particles consist of individual, unaggregated or unagglomerated primary particles.

17. The polymerizable composition of claim 1, wherein at least 90% of the $SiO_2$ particles consist of individual, unaggregated or unagglomerated primary particles.

18. The polymerizable composition of claim 1, wherein at least two different polymerizable groups are disposed on the surface of the $SiO_2$ particles.

19. The polymerizable composition of claim 18, wherein the at least two different polymerizable groups comprise a first polymerizable group selected from acryloyl, methacryloyl, itaconyl and/or styryl groups, and a second polymerizable group selected from crotonyl, vinyl, allyl and/or alkenyl groups.

20. The polymerizable composition of claim 19, wherein a fraction of the acryloyl, methacryloyl, itaconyl and/or styryl groups as a proportion of the polymerizable groups on the surface is 95% to 5% and a fraction of the crotonyl, vinyl, allyl and/or alkenyl groups as a proportion of the polymerizable groups on the surface is 5% to 95%.

21. The polymerizable composition of claim 18, wherein the $SiO_2$ particles have 0.01-3 methacryloyl groups and 0.01-3 vinyl groups/$nm^2$ on the surface.

22. The polymerizable composition of claim 1, further comprising the depolymerization retardant monomers selected from the group consisting of C1 to C8 alkyl acrylates, styrene, itatonates, N-alkylmaleimides, and N-arylmaleimides.

23. The polymerizable composition of claim 1, further comprising the depolymerization retardant monomers selected from the group consisting of methyl, ethyl, butyl, and 2-ethylhexyl acrylate.

24. The polymerizable composition of claim 22, wherein the polymerizable composition comprises 0.1% to 20% by weight of the depolymerization retardant monomers.

25. The polymerizable composition of claim 22, wherein the polymerizable composition comprises 0.2% to 10% by weight of the depolymerization retardant monomers.

26. The polymerizable composition of claim 22, wherein the polymerizable composition comprises 0.5% to 5% by weight of the depolymerization retardant monomers.

27. The polymerizable composition of claim 1, wherein a fraction of the crosslinker molecules is not more than 1% by weight.

28. The polymerizable composition of claim 1, wherein a fraction of the crosslinker molecules is not more than 0.5% by weight.

29. The polymerizable composition of claim 1, wherein a fraction of the crosslinker molecules is not more than 0.2% by weight.

30. The polymerizable composition of claim 1, wherein an amount of $SiO_2$ particles is 0.05% to 5% by weight.

31. The polymerizable composition of claim 1, wherein an amount of $SiO_2$ particles is 0.05% to 3% by weight.

32. The polymerizable composition of claim 1, wherein an amount of $SiO_2$ particles is 0.1% to 2% by weight.

33. A composition comprising a polymeric material obtainable by curing the polymerizable composition of claim 1.

34. The composition of claim 33, wherein the polymeric material is a thermoformable article, a shape memory material, or a stretched glazing material.

35. The composition of claim 33, prepared by a process comprising the steps of:
   a) heating the polymeric material to a temperature $T>T_g$;
   b) elongating or compressing the polymeric material by at least 5% in at least one spatial direction;
   c) cooling the polymeric material under load to a temperature $T<T_g$.

36. The composition of claim 35, wherein the process comprises heating the polymeric material to a temperature $T>T_g+10$ K.

37. The composition of claim 35, wherein the process comprises heating the polymeric material to a temperature $T>T_g+40$ K.

38. The composition of claim 35, wherein the process comprises heating the polymeric material to a temperature $T>T_g+50$ K.

39. The composition of claim 35, wherein the process comprises elongating or compressing the polymeric material by at least 10% in at least one spatial direction.

40. A method of producing glazing or a medical material, comprising the steps of:
   a) providing a polymerizable composition according to claim 1; and
   b) curing the polymerizable composition to produce glazing or a medical material.

41. A process for producing the composition of claim 33 comprising the steps of:
   a) providing the polymerizable composition of claim 1;
   b) adding a polymerization initiator;
   c) implementing a partial polymerization at a temperature $T<T_g$ until at least 50% of the monomers used are polymerized;
   d) completing the polymerization at a temperature $T>T_g-20$ K.

42. The process of claim 41, wherein the process comprises implementing a partial polymerization at a temperature $T<T_g-10$ K.

43. The process of claim 41, wherein the process comprises implementing a partial polymerization at a temperature $T<T_g-20$K.

44. The process of claim 41, wherein the process comprises completing the polymerization at a temperature $T>T_g-10$ K.

45. The process of claim 41, wherein the process comprises completing the polymerization at a temperature $T>T_g$.

46. The process of claim 41, further comprising the following steps:
   e) heating the polymeric material to a temperature $T>T_g$;
   f) elongating or compressing the polymeric material by at least 5% in at least one spatial direction;
   g) cooling the polymeric material under load to a temperature $T<T_g$.

47. The process of claim 46, wherein the process comprises heating the polymeric material to a temperature $T>T_g+10$ K.

48. The process of claim 46, wherein the process comprises heating the polymeric material to a temperature $T>T_g+40$ K.

49. The process of claim 46, wherein the process comprises heating the polymeric material to a temperature $T>T_g+50$ K.

50. The process of claim 46, wherein the process comprises elongating or compressing the polymeric material by at least 10% in at least one spatial direction.

* * * * *